March 24, 1942. K. D. KYSOR 2,277,331

KEY AND KEYWAY CONSTRUCTION

Filed March 8, 1940

INVENTOR.
Karl D. Kysor
BY Joseph Farley
ATTORNEY.

Patented Mar. 24, 1942

2,277,331

UNITED STATES PATENT OFFICE 2,277,331

KEY AND KEYWAY CONSTRUCTION

Karl D. Kysor, Northville, Mich., assignor to Palmer-Bee Company, Detroit, Mich., a corporation of Michigan Application March 8, 1940, Serial No. 323,045

4 Claims. (Cl. 287—52.05)

This invention relates to a novel design and association of a plurality of keys adapted to be positioned in a conventional type of key-way such as is commonly employed in combination with a key to prevent relative movement between a rotating object and the shaft upon which it is carried. The present system of keys is illustrated in the accompanying drawing in which Fig. 1 is a sectional plan view showing a portion of a unitary gear box, a gear and the shaft upon which such gear is mounted.

Heretofore in the manufacture of gear boxes designed to be used in installations where a reciprocating load is encountered, or, in other words, where the torque upon the gears of such gear box is alternately varying from positive to negative, the problem of securing the gears to their respective shafts has caused considerable difficulty from the standpoints of manufacturing process, cost, and particularly replacement after the product has gone into the hands of a user. Because of the presence of a reciprocating load, each gear must be secured to its shaft with utmost accuracy so that there will be no relative movement or backlash when the torque reverses. All methods of keying now in use have, because of the accuracy demanded, required that each gear be individually mounted on its shaft by what may be termed a hand operation rather than a production operation and the result is that the mating dimensions of no two assemblies are precisely the same. Thus, when replacement becomes necessary after a period of use, what should be a simple job is invariably troublesome and costly, it even being sometimes necessary to use a completely new gear and shaft. Furthermore, at the present time, the trend in gear box design is toward a gear box cast or otherwise formed in one piece rather than in halves, as was the old practice, thus necessitating that the gears be assembled to their respective shafts within the gear box rather than be mounted therein as a pre-assembled unit, and because of the fact that these parts are accessible in the gear box only through a very limited space or opening, the initial assembly, and especially the servicing and maintenance, are difficult and inefficient processes when former methods of securing the gears to their shafts are employed.

Figure 1:
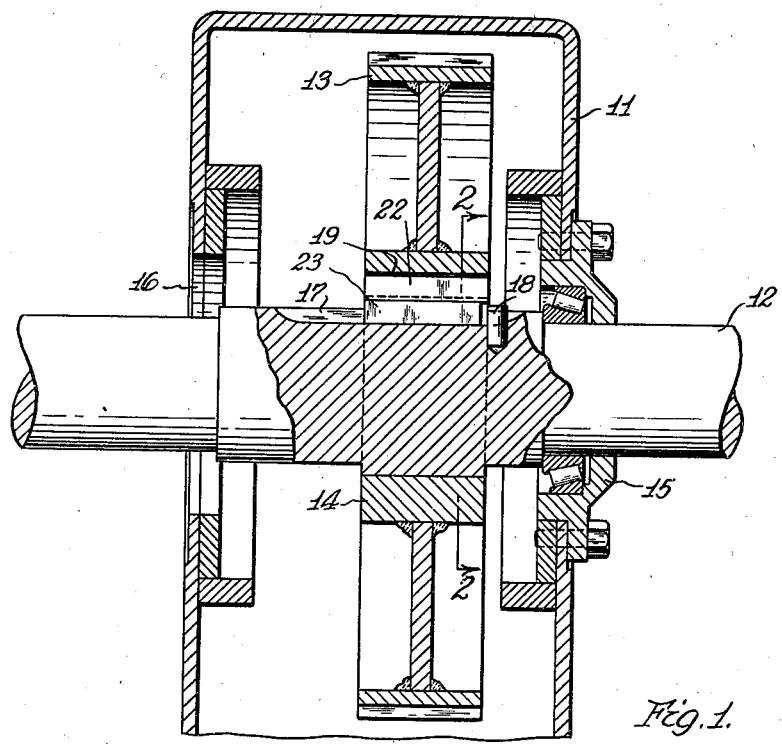
Figures 2, 3:
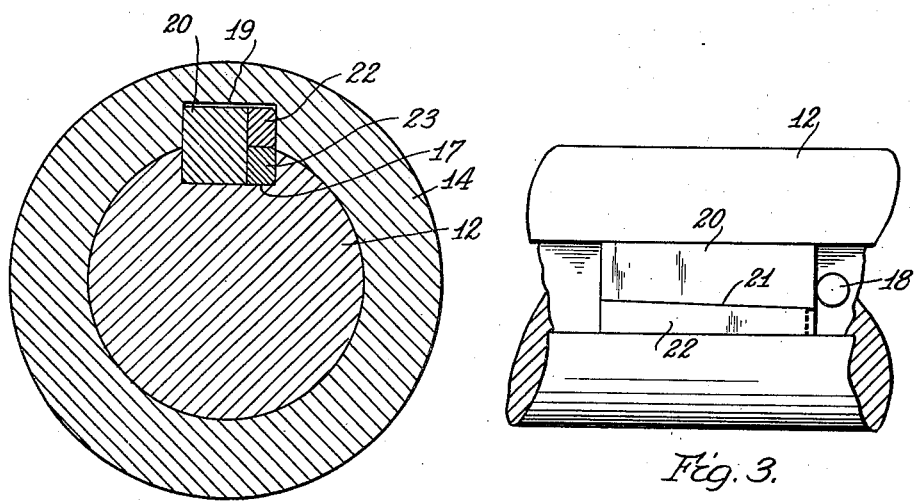
Fig. 2 is a section taken along the line 2—2 of Fig. 1.
Fig. 3 shows the shaft rotated 90° from its position in Fig. 1 to give a plan view of the key-way and the keys in position therein.

This condition is illustrated in Fig. 1, where a one-piece gear box 11 has mounted therein the shaft 12 carrying a gear 13. As can be seen, the only manner in which this gear is accessible from its side and in the region of its hub 14 and the adjacent portion of the shaft, where keying means are necessarily employed, is by removing a bearing assembly 15, leaving an opening 16 such as shown on the left side of the gear box. In the present method of securing this gear 13 to the shaft 12 a conventional type key-way 17 is formed in the shaft, it being considerably longer than the width of the gear at its hub in order that a key may readily be inserted. At one end of this key-way some form of stop, such as the dowel pin 18, is employed in order to fix the position of the keys. A key-way 19 of corresponding dimensions is provided in the hub 14 of the gear and a system of multiple keys is employed in these key-ways 17 and 19 to fix the position of the gear relative to the shaft. The manner in which these multiple keys are associated is best shown in Figs. 2 and 3 where it can be seen that one large key 20 partially fills the key-ways, engaging both the shaft 12 and the hub 14 of the gear, and this key is provided with a taper along its face 21, which face is engaged by two other keys 22 and 23, both having a corresponding taper.

In assembling these keys, after the key-ways 19 and 17 of the hub and shaft respectively have been brought into approximate alignment, the key 20 is first placed in position. Then the smaller key 23 is employed and driven into the position shown in Fig. 2 and by reason of the taper provided on the mating faces of this key 23 and the large key 20 the two keys are securely held within the key-way 17 of the shaft 12. Finally, the key 22 is likewise driven into position between the tapered face 21 of the key 20 and the remaining side of the key-way 19 of the hub of the gear. When for any reason it becomes necessary to remove the gear from the shaft the keys are dis-assembled in the reverse order from that just described; that is, the key 22 is driven out of the key-way 19 by the use of a drift punch inserted after removing the bearing cover 15 and the other keys are operated upon in like manner.

The advantages of this construction in installations where the above-discussed problems of reciprocating torque and limited accessibility are present are manifest. First, no abnormal accuracy in manufacturing is required because the result of this system of key-ways is that since the key-way 19 of the gear and the key-way 17 of the shaft are separately engaged by the tapered keys 22 and 23 respectively, the dimensions of those key-ways 19 and 17 are independent of each other in the sense that a discrepancy in dimension within ordinary manufacturing tolerances will be taken up by the tapered surface of the keys.

Second, these tapered surfaces also result in a more intimate and secure engagement between the gear and the shaft than could be ordinarily hoped for with the best of present keying means and methods.

Third, from a standpoint of initial manufacturing costs, including both machining operations and assembling, and also from a standpoint of interchangeability and maintenance, the keying system of the present invention answers all the problems and difficulties heretofore encountered; this being obvious from the above description and the drawing.

Fourth, the construction overcomes the principal difficulty heretofore encountered in previous constructions wherein repeated reversals cause unequal wear in the key-way of the shaft and gear hub resulting from difference in the materials in which the shaft and hub may be constructed; for example, with a steel shaft and cast iron gear, the gear key-way may become considerably larger than the shaft key-way, which necessitates the making and use of an offset key to compensate for the unequal wear. It will be noted by reference to Fig. 2 that the mating faces of the small keys 22, 23 are located at the junction of the shaft and bore of the hub so that the key 22 engages the hub key-way only and the key 23 the shaft key-way only. Consequently, any inequality of wear will be taken up by the tapered faces of the small keys, each of which will perform its lateral wedging action independently of the other.

I claim:

1. A means for keying a member to a shaft comprising key-ways formed in said member and said shaft, said key-ways being engaged by a system of three tapered keys, one of said keys engaging said key-ways of both said member and said shaft and said other two keys each engaging but one of said key-ways respectively.

2. A means for keying a member to a shaft comprising key-ways formed in said member and said shaft, said key-ways being engaged by a system of three keys, each of said keys having a non-tapered face and a tapered face, said keys being mutually engaging along said tapered faces, the non-tapered face of one of said keys engaging a side of both of said key-ways and the non-tapered faces of said other two keys each engaging a side of but one of said key-ways respectively.

3. A means for keying a member to a shaft comprising key-ways formed in said member and said shaft, said key-ways being engaged by a system of three keys, each of said keys having a non-tapered face and a tapered face, one of said keys occupying a portion of the width of each of said key-ways and having its non-tapered face engaging a side of each of said key-ways, a second key engaging the tapered face of said first key with its tapered face and having its non-tapered face engaging one side of said key-way in said shaft, and a third key similarly engaging the tapered face of said first key and having its non-tapered face engaging one side of said key-way in said member.

4. The combination with a pair of members provided with cooperating key-ways and means for keying said members together in driving relationship comprising a plurality of keys, consisting of a main key that extends into both of said key-ways and provided on one of its side faces with a non-tapered face for engaging one side face of both of said key-ways and being provided with a taper on its opposite side face, and a pair of auxiliary keys each having a tapered side face for engagement with the tapered side face of the main key and a non-tapered face for engaging the opposite side face of the key-way of one of said members only, the meeting faces of said auxiliary keys being located at the line of juncture between said members and each of said auxiliary keys engaging only the key-way portion of its respective member.

KARL D. KYSOR.